(12) United States Patent
Karasawa

(10) Patent No.: US 11,099,662 B2
(45) Date of Patent: Aug. 24, 2021

(54) POINTING ELEMENT, DISPLAY SYSTEM, AND METHOD OF CONTROLLING POINTING ELEMENT

(71) Applicant: SEIKO EPSON CORPORATION, Tokyo (JP)

(72) Inventor: Yukihiro Karasawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/881,714

(22) Filed: May 22, 2020

(65) Prior Publication Data
US 2020/0371611 A1 Nov. 26, 2020

(30) Foreign Application Priority Data
May 24, 2019 (JP) .............................. JP2019-097491

(51) Int. Cl.
*G06F 3/0354* (2013.01)
*G03B 21/10* (2006.01)
*G06F 3/041* (2006.01)

(52) U.S. Cl.
CPC ......... *G06F 3/03546* (2013.01); *G03B 21/10* (2013.01); *G06F 3/03542* (2013.01); *G06F 3/04146* (2019.05)

(58) Field of Classification Search
CPC ............... G06F 3/03546; G06F 3/0425; G06F 3/03542; G06F 3/0418; G06F 3/04166; G06F 3/04146; G06F 3/04162; G03B 21/10
See application file for complete search history.

(56) References Cited

U.S. PATENT DOCUMENTS

| 2005/0073508 | A1* | 4/2005 | Pittel ..................... G06F 1/3203 345/175 |
| 2006/0130583 | A1 | 6/2006 | Nakayama |
| 2010/0051356 | A1* | 3/2010 | Stern ................... G06F 3/04162 178/19.04 |

FOREIGN PATENT DOCUMENTS

| JP | H01-311284 A | 12/1989 |
| JP | H02-263132 A | 10/1990 |
| JP | H09-079863 A | 3/1997 |
| JP | 2003-344176 A | 12/2003 |
| JP | 2005-184628 A | 7/2005 |
| JP | 2006-174122 A | 6/2006 |
| JP | 2013-045206 A | 3/2013 |

* cited by examiner

Primary Examiner — Charles V Hicks
(74) Attorney, Agent, or Firm — Oliff PLC

(57) ABSTRACT

A pointing element configured to instruct an operation by being pressed against an operation surface includes a pressurizing part, a pressure sensor configured to detect a variation in the pressurizing part, an opposed part opposed to the pressure sensor, a pressing part configured to change a pressing force of pressing the opposed part against the pressure sensor in accordance with the variation in the pressurizing part caused by the pointing element pressed against the operation surface, a signal generation section configured to receive a first signal having a level based on the pressing force from the pressure sensor, and generate a second signal by changing the level of the first signal, and an output section configured to output information based on the second signal to outside of the pointing element.

13 Claims, 9 Drawing Sheets

POINTING ELEMENT, DISPLAY SYSTEM, AND METHOD OF CONTROLLING POINTING ELEMENT

The present application is based on, and claims priority from JP Application Serial Number 2019-097491, filed May 24, 2019, the disclosure of which is hereby incorporated by reference herein in its entirety.

BACKGROUND

1. Technical Field

The present disclosure relates to a pointing element, a display system, and a method of controlling a pointing element.

2. Related Art

In JP-A-2013-45206 (Document 1), there is described a pointing element capable of notifying a display device for displaying an image on a display surface of a pointing position on the display surface.

A user of the pointing element presses a tip part of the pointing element against a part of the display surface to thereby point the part. The pointing element has a switch which is switched between an ON state and an OFF state by pressure applied to the tip part. The pointing element executes an operation such as a predetermined light emitting operation when the switch is in the ON state to thereby notify the display device of the pointing position on the display surface.

Even when the tip part has contact with the display surface, the pointing element described in Document 1 is not allowed to execute the operation such as the predetermined light emitting operation until the switch changes from the OFF state to the ON state.

Therefore, it is conceivable to dispose a mechanism of pressing a predetermined member against a pressure sensor irrespective of presence or absence of the pressure to the tip part to change a force of pressing the predetermined member against the pressure sensor in accordance with the pressure to the tip part instead of the switch.

However, in this case, in the circumstance in which the tip part does not have contact with the display surface, there is a possibility that the output of the pressure sensor does not fall within a necessary range.

SUMMARY

An aspect of a pointing element according to the present disclosure is directed to a pointing element configured to instruct an operation by being pressed against an operation surface, the pointing element including a pressurizing part, a pressure sensor configured to detect a variation in the pressurizing part, an opposed part opposed to the pressure sensor, a pressing part configured to change a pressing force of pressing the opposed part against the pressure sensor in accordance with a variation in the pressurizing part, a signal generation section configured to receive a first signal having a level based on the pressing force from the pressure sensor, and generate a second signal by changing the level of the first signal, and an output section configured to output information based on the second signal to outside of the pointing element.

A method of controlling a pointing element according to the present disclosure is a method of controlling a pointing element which includes a pressure sensor, an opposed part opposed to the pressure sensor, and a pressurizing part, and instructs an operation by being pressed against an operation surface, the method including the steps of changing a pressing force of pressing the opposed part against the pressure sensor in accordance with a variation in the pressurizing part caused by the pointing element pressed against the operation surface to thereby make the pressure sensor output a first signal having a level based on the pressing force, generating a second signal by changing the level of the first signal, and outputting information based on the second signal to outside of the pointing element.

DESCRIPTION OF AN EXEMPLARY EMBODIMENT

A. First Embodiment

A1. General Description of Display System 1000

Figure 1:
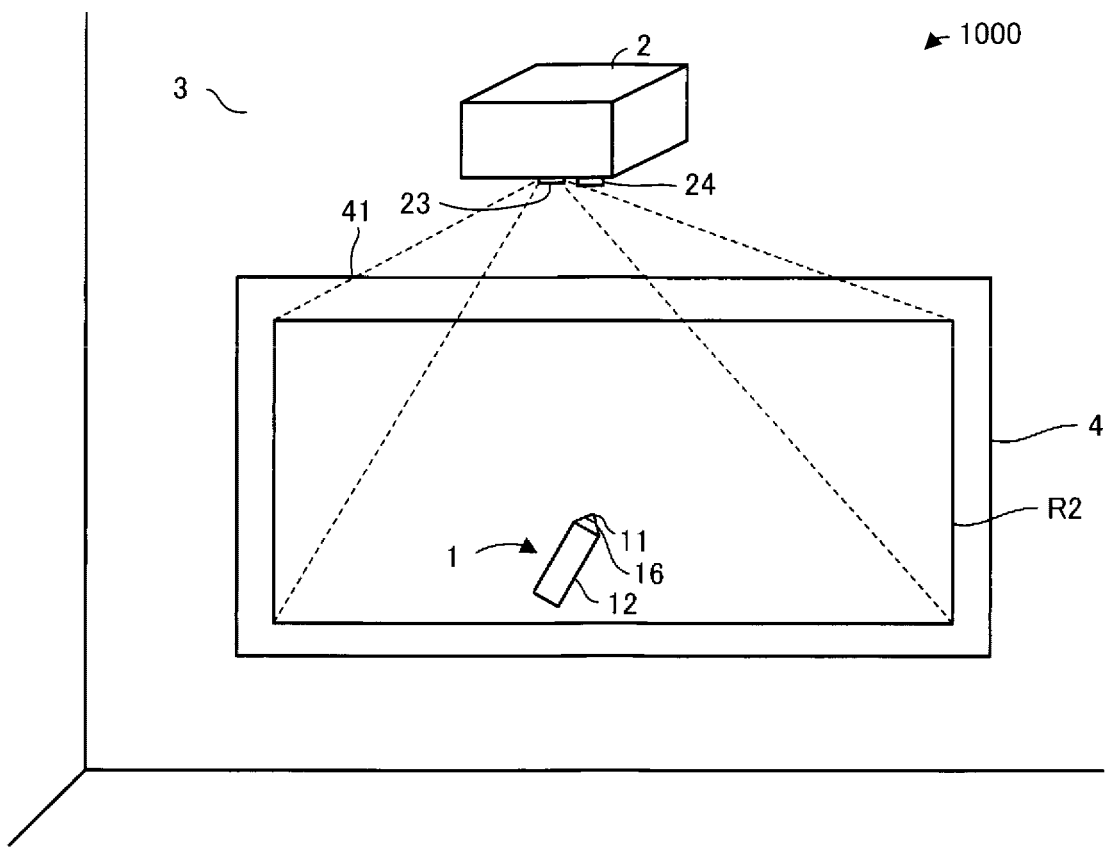
FIG. 1 is a diagram showing a display system 1000 including a pointing element 1 according to a first embodiment.

FIG. 1 is a diagram showing a display system 1000 including a pointing element 1 according to a first embodiment. The display system 1000 includes the pointing element 1 and a projector 2.

The pointing element 1 is a pointing tool shaped like a pen provided with a light emitting part 16. The shape of the pointing element 1 is not limited to the pen-like shape, but can also be, for example, a circular cylinder, a prismatic column, a circular cone, or a pyramidal shape. The user makes a tip part 11 of the pointing element 1 have contact with an operation surface to thereby make the light emitting part 16 emit light to give notice of the pointing. Further, the user grips a main body part 12 of the pointing element 1, and translates the pointing element 1 on the operation surface while making the tip part 11 have contact with a projection surface 4. The pointing element 1 outputs information based on the pressure to the tip part 11 such as pressure information representing the pressure to the tip part 11 to the outside of the pointing element 1 using light.

The projector 2 is installed in a part of a wall 3 located above an upper end 41 of the projection surface 4. The projector 2 can also be installed on, for example, a desk, a table, or the floor without being installed on the wall 3. The projector 2 can also be suspended from the ceiling. The projection surface 4 is, for example, a screen fixed to the wall 3. The projection surface 4 is not limited to the screen, but can also be a part of the wall 3, a door, or a whiteboard. The projection surface 4 is an example of a display surface and the operation surface.

The projector 2 projects an image on the projection surface 4 to thereby display the image on the projection surface 4. The projector 2 is an example of a display device. The display device is not limited to the projector 2, but can also be a display such as an FPD (Flat Panel Display). The FPD is, for example, a liquid crystal display, a plasma display, or an organic EL (Electro Luminescence) display. Out of the projection surface 4, an area where the image is projected is hereinafter referred to as a "projection area R2."

The projector 2 takes an image of an area including the projection area R2 with a camera 24 to thereby generate taken image data. The projector 2 analyzes the taken image data to thereby identify a position of the pointing element 1 relative to the operation surface, namely a pointing position by the pointing element 1. Specifically, the projector 2 identifies a part where the light emitted by the pointing element 1 shows up from the taken image represented by the taken image data to thereby identify the pointing position by the pointing element 1. Further, the projector 2 analyzes the taken image data to thereby identify the information based on the pressure to the tip part 11 of the pointing element 1, such as a pressure level representing the pressure to the tip part 11. Specifically, the projector 2 identifies the information output with light from the pointing element 1 using the taken image data to thereby identify the information based on the pressure to the tip part 11 of the pointing element 1. Further, the information based on the pressure to the tip part 11 of the pointing element 1 includes information representing whether or not the tip part 11 has contact with the operation surface.

The projector 2 identifies the pointing position by the pointing element 1 to thereby execute an associated process. For example, the projector 2 projects a line corresponding to the trajectory of the pointing position by the pointing element 1 on the projection surface 4. Further, the projector 2 changes the thickness of the line corresponding to the trajectory of the pointing element 1 based on the information based on the pressure to the tip part 11 of the pointing element 1.

Figure 2:
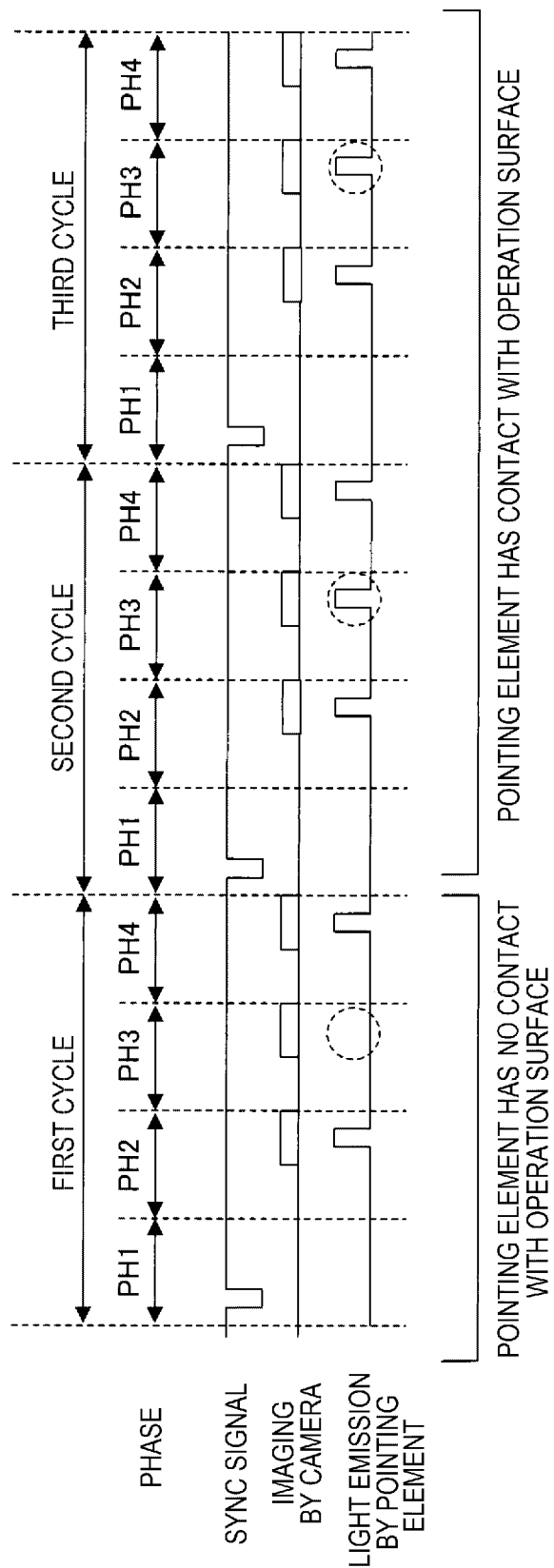
FIG. 2 is a diagram showing an operation sequence of the display system 1000.
Figure 3:
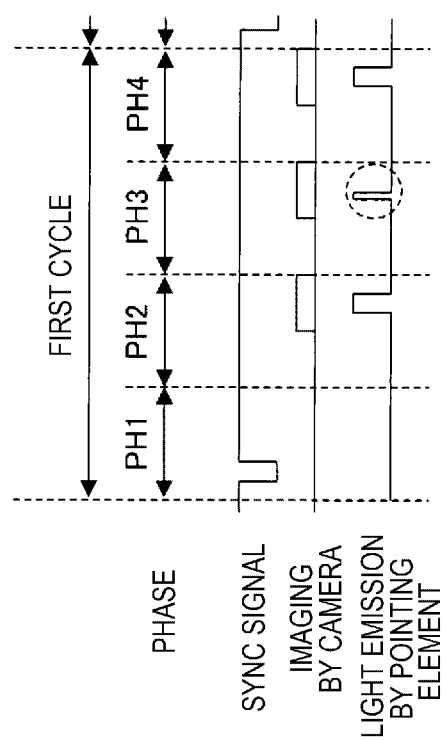
FIG. 3 is a diagram showing an operation sequence of the display system 1000.

The pointing element 1 makes the light emitting part 16 emit light only when the tip part 11 has contact with the operation surface, and it is possible for the projector 2 to take the image with the camera 24 to detect the pointing position. In the first embodiment, suppression of false detection and so on are further performed using the sequence shown in FIG. 2 to achieve an improvement of detection accuracy. FIG. 2 is a sequence chart showing a detection timing of the pointing position by the pointing element 1 in the display system 1000. The projector 2 notifies the pointing element 1 of the light emitting timing, and performs imaging with the camera 24 in sync with the light emitting timing of the pointing element 1. The pointing element 1 emits light in accordance with the timing which the pointing element 1 has been notified of by the projector 2. The present sequence is provided with four phases, namely a first phase PH1 through a fourth phase PH4, and repeats the first phase PH1 through the fourth phase PH4 in this order. The first phase PH1 is a synchronization phase, and it is possible for the pointing element to recognize the start timing of the first phase PH1 by receiving an infrared signal for synchronization from the projector 2. Since the first phase PH1 through the fourth phase PH4 are set to be the same in duration as each other, by recognizing the start timing of the first phase PH1, it is possible for the pointing element 1 to recognize the start timing of each of the second phase PH2 through the fourth phase PH4. The second phase PH2 and the fourth phase PH4 are each a phase for position detection, and the pointing element 1 emits the infrared light in each of the second phase PH2 and the fourth phase PH4. The projector 2 performs imaging with the camera 24 in sync with the light emitting timing of the pointing element 1. Thus, in the taken image data of the camera 24, the light emission of the pointing element 1 shows up as a bright point. The third phase PH3 is a phase for contact determination, and the pointing element 1 emits light in accordance with the pressure to the tip part 11 to gives notice of the contact state. Therefore, in the taken image data of the camera 24, a bright point caused by the light emission of the pointing element 1 shows up. It is possible for the projector 2 to determine that a pointing coordinate the nearest to the pointing coordinate detected from the taken image data taken in the third phase PH3 out of the pointing coordinates detected in the taken image data taken in the second phase PH2 and the fourth phase PH4 is a position where the pointing element 1 has contact with the operation surface, namely the pointing position. Further, the sequence shown in FIG. 3 shows the fact that the light emission amount in the third phase PH3 is changed in accordance with the pressure level to the tip part 11 in addition to the sequence shown in FIG. 2. In the taken image data of the camera 24 in the third phase PH3, there shows up a bright point smaller in size or a bright point darker than the bright points imaged in the second phase PH2 and the fourth phase PH4. Thus, it is possible for the projector 2 to detect the pressure level to the operation surface by the pointing element 1.

A2. One Example of Pointing Element 1

Figure 4:
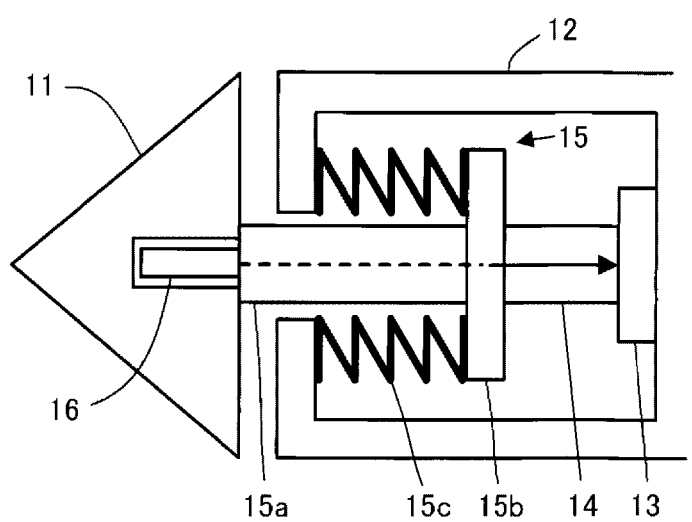
FIG. 4 is a schematic diagram showing a cross-sectional surface in the vicinity of a tip of the pointing element 1.

FIG. 4 is a schematic diagram showing a cross-sectional surface in the vicinity of a tip of the pointing element 1. As shown in FIG. 4, the pointing element 1 includes the tip part 11, the main body part 12, the pressure sensor 13, an opposed part 14, a pressing part 15, and the light emitting part 16.

The tip part 11 is located in a tip portion of the pointing element 1. The tip part 11 is used for pointing a part of the projection surface 4. The main body part 12 is gripped by, for example, a user. The pressure sensor 13 is fixed to the main body part 12. The opposed part 14 is opposed to the pressure sensor 13. The pressing part 15 presses the opposed part 14 against the pressure sensor 13 irrespective of presence or absence of the pressure to the tip part 11. Further, the pressing part 15 changes the force for pressing the opposed part 14 against the pressure sensor 13 in accordance with the pressure to the tip part 11. The tip part 11 corresponds to a pressurizing part.

The force for pressing the opposed part 14 against the pressure sensor 13 is hereinafter referred to as a "pressing force." The pressure sensor 13 outputs a first signal having a level based on the pressing force.

The light emitting part 16 is provided with an LED (Light Emitting Diode) for emitting the infrared light as a light emitting element. The light emitting element is not limited to the LED, but can also be, for example, an LD (Laser Diode) for emitting the infrared light. The pointing element 1 makes the light emitting part 16 emit light in response to the tip part 11 having contact with the projection surface 4. In the sequence shown in FIG. 2 and FIG. 3, the main body part 12 is gripped by the user, the pointing element 1 performs light emission in each of the second phase PH2 and the fourth phase PH4 in response to the notification of the light emitting timing from the projector 2, and further performs light emission in the third phase PH3 in response to the tip part 11 having contact with the projection surface 4.

The pressing part 15 includes a shaft part 15a, a receiving part 15b, and springs 15c. It should be noted that the pressing part 15 is not limited to the configuration shown in FIG. 4, but can arbitrarily be changed.

The shaft part 15a is located between the tip part 11 and the receiving part 15b. One end of the shaft part 15a has contact with the tip part 11, and the other end of the shaft part 15a has contact with the receiving part 15b. For example, the one end of the shaft part 15a is fixed to the tip part 11, and the other end of the shaft part 15a is fixed to the receiving part 15b.

The receiving part 15b is located between the shaft part 15a and the opposed part 14. One end of the receiving part 15b has contact with the shaft part 15a, and the other end of the receiving part 15b has contact with the opposed part 14. For example, the one end of the receiving part 15b is fixed to the shaft part 15a, and the other end of the receiving part 15b is fixed to the opposed part 14.

The opposed part 14 is located between the receiving part 15b and the pressure sensor 13. One end of the opposed part 14 has contact with the receiving part 15b, and the other end of the opposed part 14 has contact with the pressure sensor 13. For example, the one end of the opposed part 14 is fixed to the receiving part 15b.

The springs 15c press the receiving section 15b in a direction from the tip part 11 toward the pressure sensor 13.

As described above, the pressing part 15 presses the opposed part 14 against the pressure sensor 13 irrespective of presence or absence of the pressure to the tip part 11. The pressing part 15 changes the pressing force in accordance with the pressure to the tip part 11.

Therefore, the level of the first signal output by the pressure sensor 13 changes in response to the contact between the tip part 11 and the projection surface 4. Therefore, it is possible to make the sensitivity to the contact of the tip part 11 with the projection surface 4 higher compared to a configuration in which, for example, the contact of the tip part 11 with the projection surface 4 is detected using a switch changed between the ON state and the OFF state in accordance with the pressure applied to the tip part 11.

However, since the pressing part 15 presses the opposed part 14 against the pressure sensor 13 even in the situation in which, for example, the tip part 11 does not have contact with the projection surface 4, there is a possibility that the level of the first signal output by the pressure sensor becomes unnecessarily high. Therefore, there is a possibility that the level of the first signal becomes to fail to fall within a range necessary for controlling the light emission of the light emitting part 16.

Therefore, the pointing element 1 generates a second signal by changing the level of the first signal, and controls the light emission of the light emitting part 16 based on the second signal.

Figure 5:
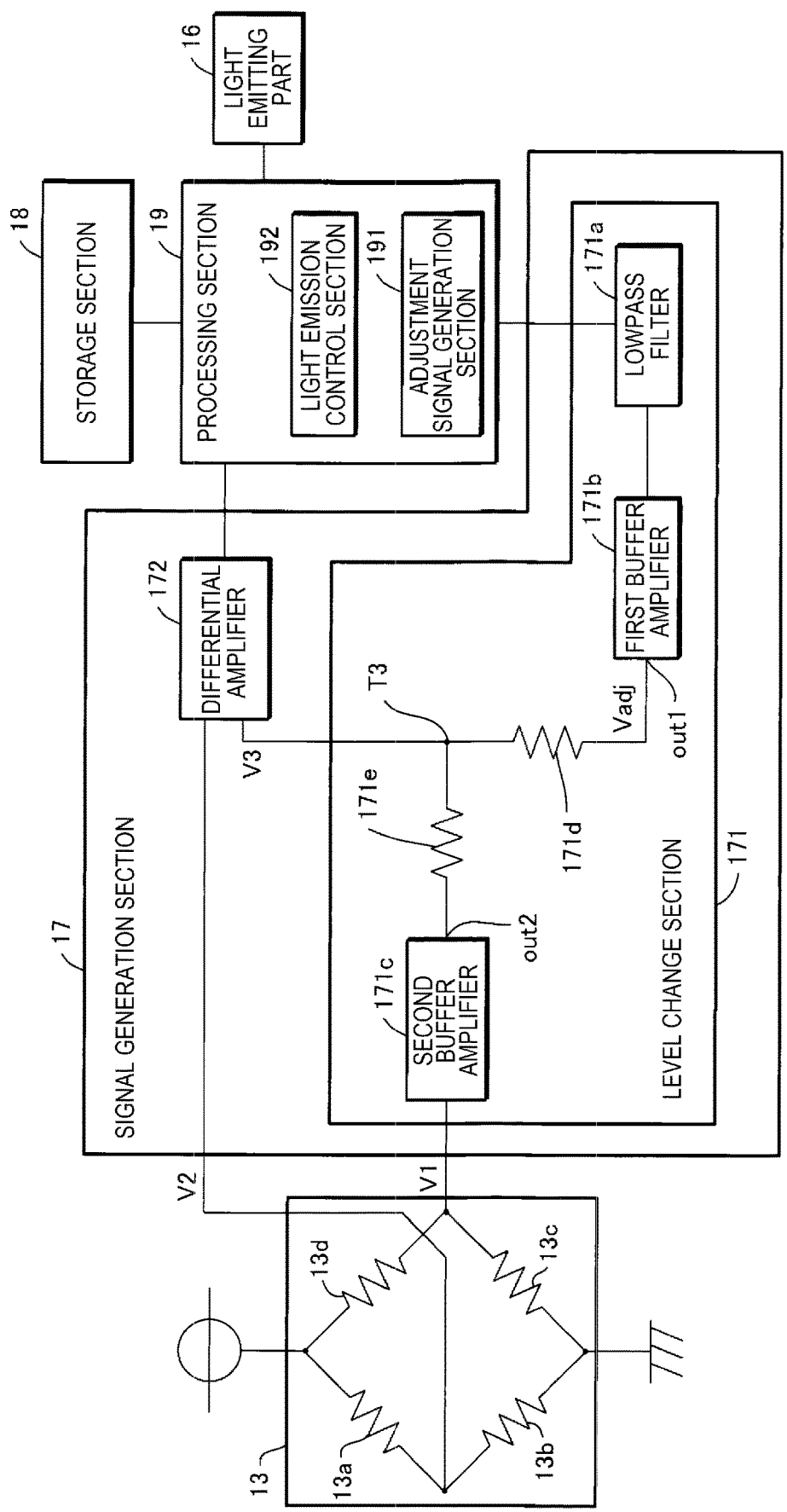
FIG. 5 is a diagram showing an example of a configuration of processing a first signal output by a pressure sensor 13.

FIG. 5 is a diagram showing an example of a configuration of processing the first signal output by the pressure sensor 13. In the example shown in FIG. 5, the pressure sensor 13 includes a first piezoresistance 13a, a second piezoresistance 13b, a third piezoresistance 13c, and a fourth piezoresistance 13d. A Wheatstone bridge circuit is constituted by the first piezoresistance 13a, the second piezoresistance 13b, the third piezoresistance 13c, and the fourth piezoresistance 13d. The pressure sensor 13 outputs a differential signal constituted by two signals as the first signal.

Hereinafter, one of the two signals constituting the differential signal is referred to as a "first sensor signal V1," and the other of the two signals constituting the differential signal is referred to as a "second sensor signal V2."

The pointing element 1 includes a signal generation section 17, a storage section 18, and a processing section 19 in addition to the elements shown in FIG. 4, specifically, the tip part 11, the main body part 12, the pressure sensor 13, the opposed part 14, the pressing part 15, and the light emitting part 16.

The signal generation section 17 receives the first signal from the pressure sensor 13. The signal generation section 17 generates the second signal Vout by changing the level of the first signal. For example, the signal generation section 17 changes the level of the first signal based on the adjustment signal for changing the level of the first signal to thereby generate the second signal Vout.

The adjustment signal is generated by an adjustment signal generation section 191 described later. The adjustment signal generation section 191 generates the adjustment signal based on a difference between a third signal Vout(pre) generated by the signal generation section 17 changing the level of the first signal prior to the generation of the second signal Vout, and a target signal Vout(target) to be a target of the second signal Vout.

The target signal Vout(target) is determined based on an input range of the processing section 19 so that the second signal Vout falls within the input range of the processing section 19. It should be noted that the input range of the processing section 19 also functions as an input range of a light emission control section 192 described later.

In the present embodiment, a target of the second signal Vout in a situation in which the tip part 11 does not have contact with an external object such as the projection surface 4 is used as the target signal Vout (target). The target signal Vout (target) is stored in advance in the storage section 18. The adjustment signal generation section 191 retrieves the target signal Vout(target) from the storage section 18.

As the adjustment signal, the adjustment signal generation section 191 generates a PWM (Pulse Width Modulation) signal obtained by performing the pulse width modulation based on a difference between the third signal Vout (pre) and the target signal Vout (target).

When the second signal Vout coincides with the target signal Vout (target), the adjustment signal generation section 191 keeps the adjustment signal output at that moment.

The signal generation section 17 includes a level change section 171 and a differential amplifier 172.

The level change section 171 generates a third sensor signal V3 by changing a level of the first sensor signal V1 out of the first sensor signal V1 included in the first signal and the second sensor signal V2 included in the first signal.

Specifically, the level change section 171 generates the third sensor signal V3 by changing the level of the first sensor signal V1 based on the adjustment signal. The level of the third sensor signal V3 is a level between the level of the first sensor signal V1 and the level of the second sensor signal V2. The third sensor signal V3 is an example of a fourth signal.

The level change section 171 includes a lowpass filter 171a, a first buffer amplifier 171b, a second buffer amplifier 171c, a first resistor 171d, and a second resistor 171e.

The lowpass filter 171a generates a first adjustment voltage based on the adjustment signal as the PWM signal. The first buffer amplifier 171b is an amplifier having a gain of 1. The first buffer amplifier 171b receives the first adjustment voltage, and outputs a second adjustment voltage Vadj the same in voltage value as the first adjustment voltage from an output terminal out1. The second buffer amplifier 171c is an amplifier having a gain of 1. The second buffer amplifier 171c receives the first sensor signal V1, and outputs an output voltage the same in voltage value as the first sensor signal V1 from an output terminal out2. One end of the first resistor 171d is coupled to a terminal T3. The other end of the first resistor 171d is coupled to the output terminal out1 of the first buffer amplifier 171b. One end of the second resistor 171e is coupled to the terminal T3. The other end of the second resistor 171e is coupled to the output terminal out2 of the second buffer amplifier 171c. Therefore, the third sensor signal V3 occurs at the terminal T3.

The differential amplifier 172 generates the second signal Vout based on, for example, a difference between the second sensor signal V2 and the third sensor signal V3.

The storage section 18 is a recording medium which can be read by the processing section 19. The storage section 18 includes a nonvolatile semiconductor memory such as a flash memory. The storage section 18 stores a control program to be executed by the processing section 19, a variety of types of data to be used by the processing section 19.

The processing section 19 is formed of, for example, a single processor or a plurality of processors. Citing an example, the processing section 19 is formed of a single CPU (Central Processing Unit) or a plurality of CPUs.

Some or all of the functions of the processing section 19 can also be configured by a circuit such as a DSP (Digital Signal Processor), an ASIC (Application Specific Integrated Circuit), a PLD (Programmable Logic Device), or an FPGA (Field Programmable Gate Array). The processing section 19 executes a plurality of type of processing in parallel or in sequence.

The processing section 19 retrieves the control program from the storage section 18 and then executes the control program to thereby function as the adjustment signal generation section 191 and the light emission control section 192. The adjustment signal generation section 191 generates the adjustment signal as described above. Based on the second signal Vout, the light emission control section 192 makes the light emitting part 16 output the information based on the second signal Vout. The light emission control section 192 is an example of a control section.

The light emission control section 192 determines whether or not the level of the second signal Vout is lower than a threshold value. The threshold value is a value for determining whether or not pressure is applied to the tip part 11. When the level of the second signal Vout is lower than the threshold value, the light emission control section 192 determines that no pressure is applied to the tip part 11. When the level of the second signal Vout is no lower than the threshold value, the light emission control section 192 determines that pressure is applied to the tip part 11.

When the level of the second signal Vout is lower than the threshold value, the light emission control section 192 does not make the light emitting part 16 emit light. When the level of the second signal Vout is no lower than the threshold value, the light emission control section 192 controls a light emission pattern of the light emitting part 16. In this case, the light emission control section 192 changes the light emission pattern of the light emitting part 16 in accordance with the level of the second signal Vout. Therefore, the light emission pattern of the light emitting part 16 becomes an example of the information representing the pressure to the tip part 11. The light emission pattern of the light emitting part 16 is an example of the information based on the second signal Vout. The light emitting part 16 is an example of an output section for outputting the information based on the second signal Vout to the outside of the pointing element 1.

A3. One Example of Projector 2

Figure 6:
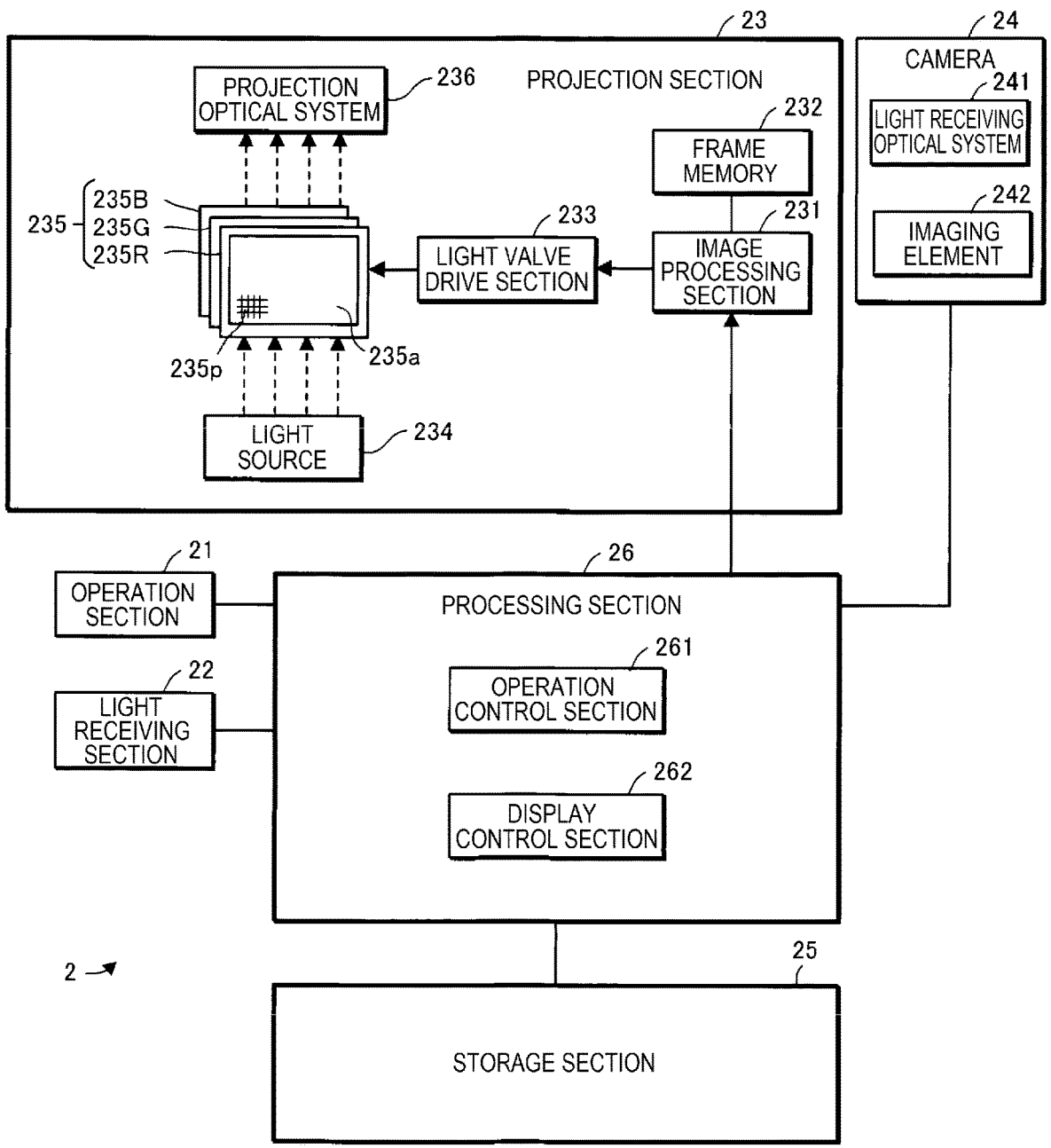
FIG. 6 is a diagram showing an example of a projector 2.

FIG. 6 is a diagram showing an example of the projector 2. The projector 2 includes an operation section 21, a light receiving section 22, a projection section 23, the camera 24, a storage section 25, and a processing section 26.

The operation section 21 is, for example, a variety of operating buttons, operating keys, or a touch panel. The operation section 21 is provided to the housing of the projector 2. The operation section 21 receives the input operation of the user.

The light receiving section 22 receives an infrared signal based on the input operation to a remote controller not shown from the remote controller. The remote controller is provided with a variety of operating buttons, operating keys, or a touch panel for receiving the input operation.

The projection section 23 projects an image on the projection surface 4 to thereby display the image on the projection surface 4. The projection section 23 is an example of a display section. The projection section 23 includes an image processing section 231, a frame memory 232, a light valve drive section 233, a light source 234, a red-color liquid crystal light valve 235R, a green-color liquid crystal light valve 235G, a blue-color liquid crystal light valve 235B, and a projection optical system 236. When there is no need to distinguish the red-color liquid crystal light valve 235R, the green-color liquid crystal light valve 235G, and the blue-color liquid crystal light valve 235B from each other, these are hereinafter referred to as "liquid crystal light valves 235."

The image processing section 231 is formed of a circuit such as a single image processor or a plurality of image processors. The image processing section 231 receives image data from, for example, the processing section 26. It is possible for the image processing section 231 to receive the image data from an image supply device not shown. The image supply device is, for example, a PC (Personal Computer). The image supply device is not limited to the PC, but can also be, for example, a tablet terminal, a smartphone, a video reproduction device, a DVD (Digital Versatile Disc) player, a Blu-ray disc player, a hard disk recorder, a television tuner device, or a video game device.

The image processing section 231 develops the image data in the frame memory 232. The frame memory 232 is formed of a storage device such as a RAM (Random Access Memory). The image processing section 231 performs image processing on the image data having been developed in the frame memory 232 to thereby generate an image signal.

The image processing to be performed by the image processing section 231 includes, for example, a resolution conversion process. In the resolution conversion process, the image processing section 231 converts the resolution of the image data into, for example, the resolution of the liquid crystal light valves 235. The image processing section 231 can also execute other image processing such as a geometric correction process of correcting the keystone distortion of the image projected by the projection section 23, and an OSD (On Screen Display) process of superimposing an OSD image on the image represented by the image data provided by the image supply device in addition to the resolution conversion process.

The light valve drive section 233 is formed of a circuit such as a driver. The light valve drive section 233 drives the liquid crystal light valves 235 based on the image signal provided from the image processing section 231.

The light source 234 is, for example, an LED. The light source 234 is not limited to the LED, but can also be, for example, a xenon lamp, a super-high pressure mercury lamp, or a laser source. The light emitted from the light source 234 is reduced in variation in the brightness distribution by an integrator optical system not shown, and is then separated by a color separation optical system not shown into colored light components of red, green, and blue as the three primary colors of light. The red colored light component enters the red-color liquid crystal light valve 235R. The green colored light component enters the green-color liquid crystal light valve 235G. The blue colored light component enters the blue-color liquid crystal light valve 235B.

The liquid crystal light valves 235 are each formed of a liquid crystal panel having a liquid crystal material existing between a pair of transparent substrates, and so on. The liquid crystal light valves 235 each have a pixel area 235a having a rectangular shape and including a plurality of pixels 235p arranged in a matrix. In each of the liquid crystal light valves 235, a drive voltage is applied to the liquid crystal for each of the pixels 235p. When the light valve drive section 233 applies the drive voltages based on the image signal to the respective pixels 235p, each of the pixels 235p is set to the light transmittance based on the drive voltage. The light emitted from the light source 234 is modulated by passing through the pixel area 235a, and thus, the image based on the image signal is formed for each colored light. The liquid crystal light valves 235 are an example of the light modulation device.

The images of the respective colors are combined by a color combining optical system not shown for each of the pixels 235p, and thus, a color image is generated. The color image is projected via the projection optical system 236.

The camera 24 takes an image of an area including the projection area R2 to thereby generate the taken image data. The camera 24 includes a light receiving optical system 241 such as a lens, and an imaging element 242 for converting the light collected by the light receiving optical system 241 into an electric signal. The imaging element 242 is, for example, a CCD (Charge Coupled Device) image sensor for receiving the light in, for example, an infrared region and a visible light region. The imaging element 242 is not limited to the CCD image sensor, but can also be a CMOS (Complementary Metal Oxide Semiconductor) image sensor for receiving the light in, for example, the infrared region and the visible light region.

The camera 24 can also be provided with a filter for shielding a part of the light entering the imaging element 242. For example, when making the imaging element 242 receive the infrared light, the camera 24 dispose the filter mainly transmitting the light in the infrared region in front of the imaging element 242.

The camera 24 can be disposed as a separate member from the projector 2. In this case, the camera 24 and the projector 2 can be coupled to each other with a wired or wireless interface so as to be able to transmit/receive data.

When the camera 24 performs the imaging with the visible light, the image projected by the projection section 23 on the projection surface 4, for example, is taken. The taken image data generated by the camera 24 performing imaging with the visible light is hereinafter referred to as "visible light taken image data." The visible light taken image data is used in, for example, a calibration described later.

When the camera 24 performs the imaging with the infrared light, the taken image data representing the infrared light emitted by, for example, the pointing element 1 is generated. The taken image data generated by the camera 24 performing imaging with the infrared light is hereinafter referred to as "infrared light taken image data." The infrared light taken image data is used for detecting, for example, the pointing position by the pointing element 1 on the projection surface 4.

The storage section 25 is a recording medium which can be read by the processing section 26. The storage section 25 includes, for example, a nonvolatile memory and a volatile memory. As the nonvolatile memory, there can be cited, for example, a ROM (Read Only Memory), an EPROM (Erasable Programmable Read Only Memory), and an EEPROM (Electrically Erasable Programmable Read Only Memory). As the volatile memory, there can be cited, for example, a RAM (Random Access Memory).

The storage section 25 stores a control program to be executed by the processing section 26, a variety of types of data to be used by the processing section 26.

The processing section 26 is formed of, for example, a single processor, or a plurality of processors. Citing an example, the processing section 26 is formed of a single CPU or a plurality of CPUs. Some or all of the functions of the processing section 26 can be configured by a circuit such as a DSP, an ASIC, a PLD, or an FPGA. The processing section 26 executes a plurality of type of processing in parallel or in sequence.

The processing section 26 retrieves the control program from the storage section 25 and then executes the control program to thereby function as an operation control section 261 and a display control section 262.

The operation control section 261 controls a variety of operations of the projector 2. For example, the operation control section 261 executes the calibration. The calibration is a process of associating a coordinate on the frame memory 232 and a coordinate on the taken image data with each other. The coordinate on the frame memory 232 corresponds to a position on the image to be projected on the projection surface 4. By the position on the frame memory 232 and the position on the taken image data being associated with each other, it is possible to identify a part corresponding to the pointing position by the pointing element 1 on the projection surface 4 in, for example, the image to be projected on the projection surface 4.

The calibration will hereinafter be described.

The operation control section 261 retrieves calibration image data from the storage section 25. It should be noted that it is also possible for the operation control section 261 to generate the calibration image data in accordance with the control program. The operation control section 261 provides the image processing section 231 with the calibration image data.

The image processing section 231 develops the calibration image data on the frame memory 232, and then executes the resolution conversion process and the like on the calibration image data to thereby generate the image signal. When the image processing section 231 provides the image signal to the light valve drive section 233, the calibration image in which marks each having a shape set in advance arranged with intervals is projected on the projection surface 4.

Subsequently, the operation control section 261 makes the camera 24 take the calibration image with the visible light. The camera 24 takes the calibration image with the visible light to thereby generate the visible light taken image data.

Subsequently, the operation control section 261 obtains the visible light taken image data from the camera 24. The operation control section 261 detects the marks represented by the visible light taken image data to identify barycentric positions of the respective marks as coordinates of the respective marks in the taken image data.

Subsequently, the operation control section 261 performs association between the coordinates of the marks detected from the visible light taken image data and the coordinates of the marks on the frame memory 232. Due to the association, the operation control section 261 generates calibration data for associating a coordinate on the taken image data and a coordinate on the frame memory 232 with each other. The operation control section 261 stores the calibration data in the storage section 25.

The description of the calibration is hereinabove presented.

When the operation control section 261 has completed the calibration, the operation control section 261 makes the camera 24 perform imaging with the infrared light to generate the infrared light taken image data.

The display control section 262 identifies the pointing position by the pointing element 1 using the infrared light taken image data and the calibration data.

The display control section 262 generates the image data representing a line showing the trajectory of the pointing element 1 based on the pointing positions of the pointing element 1. The image data representing the line showing the trajectory of the pointing element 1 is hereinafter referred to as "tentative trajectory image data."

Further, the display control section 262 identifies the light emission pattern of the pointing element 1 using the infrared light taken image data. The display control section 262 identifies the level of the pressure to the tip part 11 of the pointing element 1 based on the light emission pattern of the pointing element 1. For example, when the storage section 25 stores a first table representing the correspondence relationship between the light emission pattern of the pointing element 1 and the level of the pressure to the tip part 11, the display control section 262 refers to the first table to thereby identify the level of the pressure to the tip part 11 of the pointing element 1 based on the light emission pattern of the pointing element 1.

The display control section 262 corrects the tentative trajectory image data based on the level of the pressure to the tip part 11 to thereby generate the trajectory image data. In the trajectory image data, the thickness of the line showing the trajectory of the pointing element 1 is determined in accordance with the level of the pressure to the tip part 11. For example, it is possible for the user to change the thickness of the line representing the trajectory with the pressing state of the pointing element 1 against the operation surface.

A4. Adjustment Operation in Pointing Element 1

Figure 7:
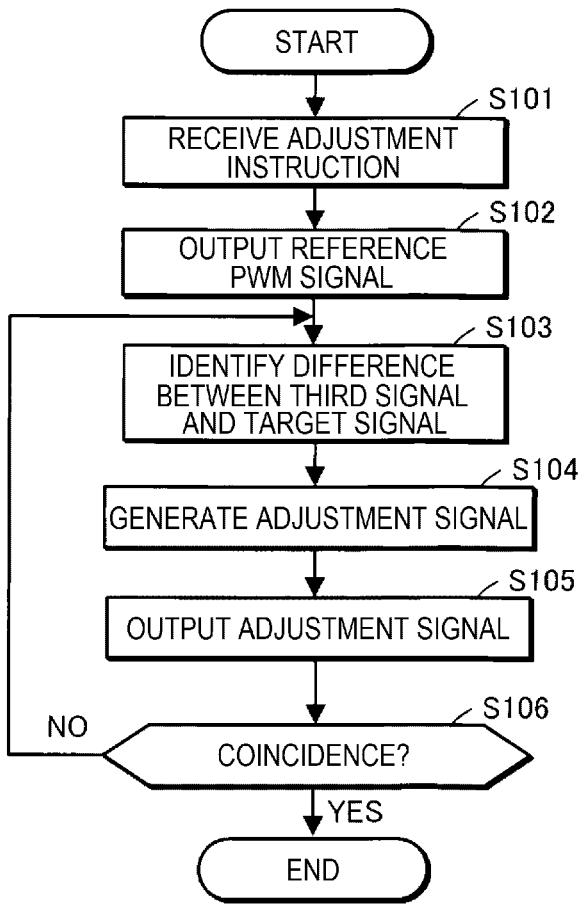
FIG. 7 is a flowchart for explaining an adjustment operation in the pointing element 1.

FIG. 7 is a flowchart for explaining an adjustment operation in the pointing element 1. The adjustment operation means an operation for adjusting the second signal Vout output by the differential amplifier 172 to coincide with the target signal Vout (target). The adjustment operation is executed in the circumstance in which, for example, the tip part 11 does not have contact with an external object such as the projection surface 4.

When the adjustment signal generation section 191 receives an adjustment instruction from the input section not shown in the step S101, the adjustment signal generation section 191 outputs a reference PWM signal to the lowpass filter 171a in the step S102.

The reference PWM signal means, for example, a PWM signal capable of making the second signal Vout coincide with the target signal Vout (target) in the calculation based on the design of the pointing element 1.

Therefore, when the pointing element 1 has been formed as designed, it is possible to make the second signal Vout coincide with the target signal Vout(target). However, it is difficult to form the pointing element 1 as designed in a precise sense, and dimensional errors often occur. In the present embodiment, the shift of the second signal Vout from the target signal Vout(target) caused by such dimensional errors inherent to the pointing element 1 can also be corrected as described below.

In the step S103, the adjustment signal generation section 191 identifies a difference between the third signal Vout(pre) output from the differential amplifier 172 in the circumstance in which the reference PWM signal is output to the lowpass filter 171a, and the target signal Vout(target).

Subsequently, in the step S104, the adjustment signal generation section 191 generates the adjustment signal based on the difference between the third signal Vout (pre) and the target signal Vout(target).

The third signal Vout(pre) can be calculated by Formula 1 below.

$$V_{out(pre)} = \left(\frac{V_1 - V_{adj(pre)}}{R_1 + R_2}R_2 + V_{adj(pre)} - V_2\right)\text{GAIN} \quad (1)$$

Here, the reference symbol Vadj(pre) denotes the output of the first buffer amplifier 171b in the circumstance in which the reference PWM signal is input to the lowpass filter 171a. The reference symbol R1 denotes a resistance value of the first resistor 171d. The reference symbol R2 denotes a resistance value of the second resistor 171e. The reference symbol GAIN denotes a gain of the differential amplifier 172.

Further, the second adjustment voltage Vadj (target) necessary to change the output signal of the differential amplifier 172 from the third signal Vout(pre) to the target signal Vout (target) can be calculated by Formula 2 below which is based on Formula 1.

$$V_{adj(target)} = \frac{\text{GAIN} \cdot R_1 \cdot V_{adj(pre)} - (R_1 + R_2)(V_{out(pre)} - V_{out(target)})}{\text{GAIN} \cdot R_1} \quad (2)$$

The adjustment signal generation section 191 firstly calculates the second adjustment voltage Vadj(target) using Formula 2. On this occasion, as the third signal Vout(pre), there is used a result of the detection of the signal received by the processing section 19 from the differential amplifier 172 in the circumstance in which the reference PWM signal is input to the lowpass filter 171a.

Subsequently, as the adjustment signal, the adjustment signal generation section 191 generates a PWM signal for making the first buffer amplifier 171b generate the second adjustment voltage Vadj(target).

For example, when the storage section 18 stores a second table representing a correspondence relationship between the second adjustment voltage Vadj (target) and a degree of the modulation in the PWM signal, the adjustment signal generation section 191 refers to the second table to thereby generate the PWM signal having the degree of the modulation corresponding to the second adjustment voltage Vadj (target) as the adjustment signal.

Subsequently, in the step S105, the adjustment signal generation section 191 outputs the adjustment signal to the lowpass filter 171a.

Subsequently, in the step S106, the adjustment signal generation section 191 determines whether or not the signal output by the differential amplifier 172 in the circumstance in which the adjustment signal is output coincides with the target signal Vout(target).

For example, when the level of the third signal Vout(pre) is within an input range of the processing section 19, the signal output by the differential amplifier 172 in the circumstance in which the adjustment signal is output coincides with the target signal Vout(target).

In contrast, when the level of the third signal Vout(pre) runs off the input range of the processing section and is saturated, the level of the signal from the differential amplifier 172 to be used as the third signal Vout(pre) in Formula 2 becomes a level of the saturated state. Therefore, the third signal Vout(pre) in Formula 2 fails to represent the level of the signal output by the differential amplifier 172. Therefore, the signal output by the differential amplifier 172 in the circumstance in which the adjustment signal is output does not coincide with the target signal Vout(target).

When the signal output by the differential amplifier 172 does not coincide with the target signal Vout (target), the process returns to the step S103. In this case, in the step S103 and step S104, the signal compared to the target signal Vout(target) in the step S106 is used instead of the third signal Vout(pre).

Therefore, when the output signal of the differential amplifier 172 reaches the upper limit of the input range of the processing section 19 and is thus saturated at the start of the adjustment operation, the operation of generating the PWM signal is repeated in accordance with the second adjustment voltage Vadj(target) derived from Formula 2. Therefore, it is possible to make the output signal of the differential amplifier 172 coincide with the target signal Vout(target). Further, since the PWM signal is generated in accordance with the second adjustment voltage Vadj(target) derived from Formula 2, it is possible to prevent the number of times of the repetition of the operation of generating the PWM signal from becoming unnecessarily large.

When the signal output by the differential amplifier 172 coincides with the target signal Vout(target), the operation shown in FIG. 7 ends, and the adjustment signal at that moment continues to be output.

A5. Light Emitting Operation in Pointing Element 1

Figure 8:
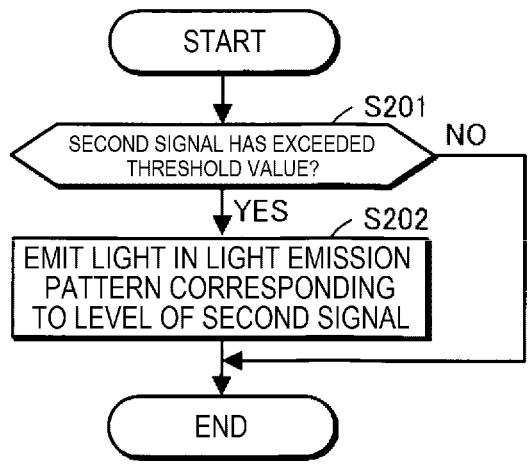
FIG. 8 is a flowchart for explaining a light emitting operation in the pointing element 1.

FIG. 8 is a flowchart for explaining the light emitting operation for a notification of the information based on the pressure to the tip part 11 in the pointing element 1.

When the level of the second signal Vout exceeds a threshold value in the step S201, the light emission control section 192 performs control of the light emission pattern of the light emitting part 16 in the step S202.

In the step S202, the light emission control section 192 changes the light emission pattern of the light emitting part 16 in accordance with the level of the second signal Vout. Therefore, the light emission pattern of the light emitting part 16 represents the level of the second signal Vout, namely the detection result of the pressure sensor 13. In the sequence shown in FIG. 2, the light emission pattern is changed so as to emit light also in the third phase PH3 in addition to the light emission in the second phase PH2 and the fourth phase PH4. Further, in the sequence shown in FIG. 3, the amount of light emitted in the third phase PH3 is changed in accordance with the level of the pressure to the tip part 11. In the sequence shown in FIG. 3, there is shown the light emission pattern in which the light emission duration in the third phase PH3 is made shorter than the light emission duration in the second phase PH2 and the fourth phase PH4.

When the level of the second signal Vout output by the differential amplifier 172 is lower than the threshold value in the step S201, the light emission control section 192 terminates the operation without executing the step S202.

A6. Operation of Projector 2

Figure 9:
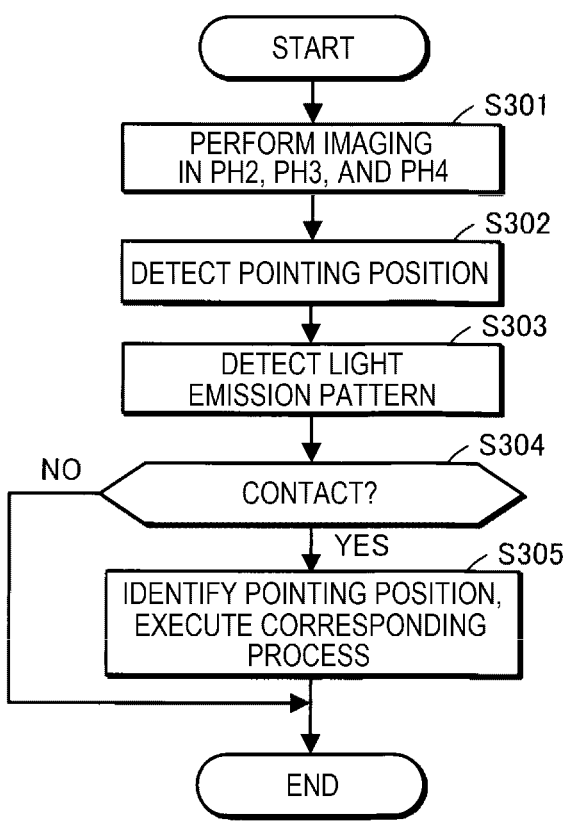
FIG. 9 is a flowchart for explaining an operation of the projector 2.

FIG. 9 is a flowchart for explaining the operation of the projector 2. The operation shown in FIG. 9 is repeatedly performed. Hereinafter, it is assumed that the pointing element 1 and the projector 2 operate in sync with each other in the sequence shown in FIG. 2. Further, it is also assumed that the calibration has already been performed, and the calibration data has been stored in the storage section 25.

In the step S301, the camera 24 performs the imaging of the infrared light to thereby generate the taken image data in the second phase PH2, the third phase PH3, and the fourth phase PH4.

In the step S302, the display control section 262 analyzes the taken image data to thereby detect the pointing position by the pointing element 1 in the image represented by the taken image data. The display control section 262 converts the pointing position into the pointing position on the frame memory 232 using the calibration data.

In the step S303, the display control section 262 analyzes the taken image data to detect the light emission pattern of the pointing element 1. In the step S304, the display control section 262 determines whether or not the pointing element 1 has contact with the operation surface based on the light emission pattern of the pointing element 1.

When the display control section 262 has determined that the light emission pattern represents the contact of the pointing element 1 with the operation surface, the display control section 262 detects the pointing position relative to the operation surface of the pointing element 1 and makes the projector 2 execute the process corresponding to the pointing position in the step S305. When the light emission pattern represents that the pointing element 1 has no contact with the operation surface, the display control section 262 terminates the operation shown in FIG. 9.

As an example of the process corresponding to the pointing position in the step S304 shown in FIG. 9, there is cited a drawing process by the pointing element 1 to the operation surface. When the markers associated with the processing contents are displayed in advance, and the pointing element 1 points the marker, the projector 2 executes the process associated with that marker. For example, when the marker associated with the drawing process by the pointing element 1 to the operation surface is pointed, it becomes possible for the pointing element 1 to perform drawing to the operation surface.

Figure 10:
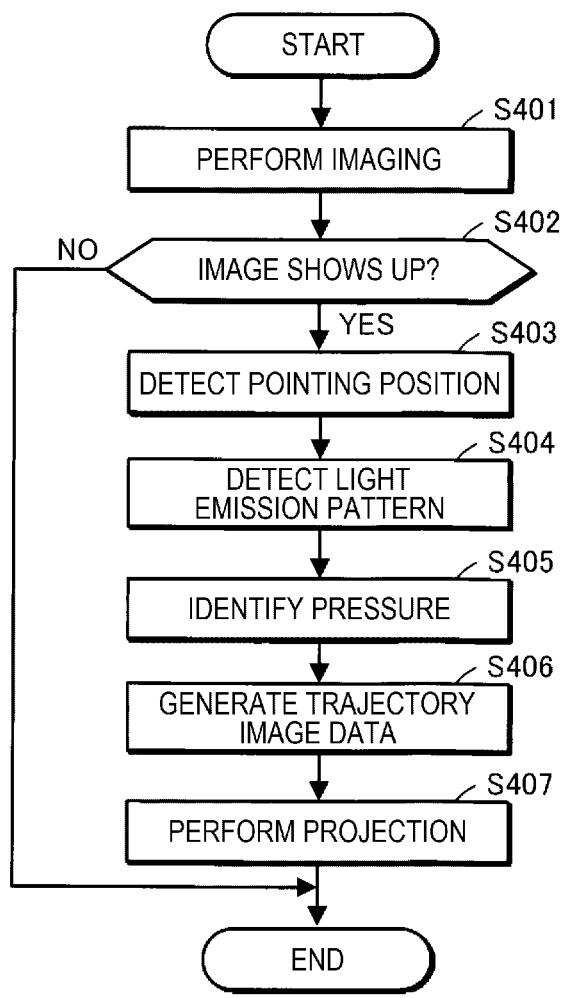
FIG. 10 is a flowchart for explaining an operation of the projector 2.

FIG. 10 shows an operation in which the drawing process by the pointing element 1 to the operation surface is enabled, and the thickness of the line representing the trajectory of the pointing element 1 is changed in accordance with the pressure to the tip part 11.

In the step S401, the camera 24 performs imaging with the infrared light to thereby generate the taken image data.

Subsequently, in the step S402, the display control section 262 determines whether or not the image of the infrared light emitted by the pointing element 1 shows up in the taken image data.

When the image of the infrared light emitted by the pointing element 1 does not show up in the taken image data, the operation shown in FIG. 10 terminates.

When the image of the infrared light emitted by the pointing element 1 shows up in the taken image data, the display control section 262 analyzes the taken image data to thereby detect the pointing position by the pointing element 1 in the image represented by the taken image data in the step S403. The display control section 262 converts the pointing position into the pointing position on the frame memory 232 using the calibration data.

In the step S404, the display control section 262 analyzes the taken image data to detect the light emission pattern of the pointing element 1.

Subsequently, in the step S405, the display control section 262 identifies the pressure to the tip part 11 of the pointing element 1 based on the light emission pattern of the pointing element 1. For example, the display control section 262 refers to the first table described above to thereby identify the pressure to the tip part 11 of the pointing element 1 from the light emission pattern of the pointing element 1.

Subsequently, in the step S406, the display control section 262 generates the tentative trajectory image data based on the pointing position by the pointing element 1 and the pressure to the tip part 11.

For example, the display control section 262 firstly generates the tentative trajectory image data based on the pointing position by the pointing element 1. Subsequently, the display control section 262 corrects the tentative trajectory image data based on the pressure to the tip part 11 to thereby generate the trajectory image data. In the trajectory image data, the thickness of the line showing the trajectory of the pointing element 1 represented by the tentative trajectory image data is changed in accordance with the pressure to the tip part 11. Citing an example, the higher the pressure to the tip part 11 is, the thicker the display control section 262 makes the line showing the trajectory of the pointing element 1.

Subsequently, the display control section 262 provides the trajectory image data to the projection section 23. The projection section 23 projects the line showing the trajectory of the pointing element 1 represented by the trajectory image data on the projection surface 4 in the step S407.

A7. Conclusion of First Embodiment

The pointing element 1, the display system 1000, and the operation method according to the present embodiment described above include the following aspects.

The pressing part 15 presses the opposed part 14 against the pressure sensor 13 irrespective of presence or absence of the pressure to the tip part 11, and changes the pressing force for pressing the opposed part 14 against the pressure sensor 13 in accordance with the pressure to the tip part 11. The signal generation section 17 receives the first signal having a level based on the pressing force from the pressure sensor 13, and then generates the second signal by changing the level of the first signal. The light emitting part 16 outputs the information based on the second signal to the outside of the pointing element 1.

According to this aspect, the pressing part 15 presses the opposed part 14 against the pressure sensor 13 irrespective of presence or absence of the pressure to the tip part 11, and changes the pressing force for pressing the opposed part 14 against the pressure sensor 13 in accordance with the pressure to the tip part 11.

Therefore, it is possible to make the sensitivity to the contact of the tip part 11 with the projection surface 4 higher compared to a configuration in which, for example, the contact of the tip part 11 with the projection surface 4 is detected using a switch changed between the ON state and the OFF state in accordance with the pressure applied to the tip part 11.

Further, the signal generation section 17 changes the level of the first signal output by the pressure sensor 13 to thereby generate the second signal, and the light emitting part 16 outputs the information based on the second signal to the outside of the pointing element 1.

Therefore, even when the level of the first signal output by the pressure sensor 13 does not fall within the necessary range due to the existence of the pressing part 15, it is possible to generate the second signal by changing the level of the first signal. Further, it is possible to output the information based on the second signal to the outside of the pointing element 1.

Therefore, it is possible to suppress the false operation of the pointing element 1 while raising the sensitivity of the pointing element 1 to the contact of the tip part 11 with the projection surface 4.

The adjustment signal generation section 191 generates the adjustment signal for changing the level of the first signal based on the difference between the third signal Vout(pre) generated by the signal generation section 17 changing the level of the first signal prior to the generation of the second signal Vout, and the target signal Vout (target) to be the target of the second signal Vout. The signal generation section 17 generates the second signal Vout by changing the level of the first signal based on the adjustment signal. According to this aspect, the second signal Vout can automatically be generated.

Based on the second signal Vout, the light emission control section 192 makes the light emitting part 16 execute the light emission based on the second signal Vout. The target signal Vout(target) is determined based on the input range of the light emission control section 192. According to this aspect, it is possible to determine the target signal Vout (target) so that, for example, the second signal Vout falls within the input range of the light emission control section 192.

The level change section 171 generates the third sensor signal V3 by changing the level of the first sensor signal V1 based on the adjustment signal. The differential amplifier 172 generates the second signal Vout based on the difference between the second sensor signal V2 and the third sensor signal V3. According to this aspect, even when the pressure sensor 13 outputs the differential signal as the first signal, it is possible to suppress the false operation of the pointing element 1 while making the sensitivity to the contact of the tip part 11 with the projection surface 4 higher.

B. Modified Examples

Some aspects of the modifications of the embodiment illustrated hereinabove will be illustrated blow. It is also possible to arbitrarily combine tow or more aspects arbitrarily selected from the following illustrations with each other within a range in which the aspects do not conflict with each other.

B1. First Modified Example

In the first embodiment, the output of the information based on the second signal Vout is not limited to the output using the light emission pattern in the light emitting part 16.

For example, it is possible for the pointing element 1 to transmit the information based on the pressure to the tip part 11 as an example of the information based on the second signal Vout with a communication section for executing the communication using the Near Field Communication method, and it is possible for the projector 2 to receive the information based on the pressure to the tip part 11 with a communication section for executing the communication using the Near Field Communication method. In this case, the communication section provided to the pointing element 1 becomes another example of the output section. As examples of the Near Field Communication method, there can be cited Bluetooth and Wi-Fi. Bluetooth is a registered trademark. Wi-Fi is a registered trademark. The communication method of the wireless communication between the pointing element 1 and the projector 2 is not limited to the Near Field Communication method, but can also be other communication methods.

B2. Second Modified Example

In the first embodiment and the first modified example, the adjustment signal is not limited to the PWM signal, but can also be, for example, a signal representing the second adjustment voltage Vadj(target). In this case, the lowpass filter 171a can be omitted.

B3. Third Modified Example

In the first embodiment, and the first modified example through the second modified example, the information based on the second signal Vout is not limited to the information representing the pressure to the tip part 11.

For example, it is also possible to use width information representing the width of the line showing the trajectory of the pointing element 1 as the information based on the second signal Vout. In this case, the higher the pressure to the tip part 11 is, the wider the light emission control section 192 makes the width represented by the width information, for example. The projector 2 determines the width of the line corresponding to the trajectory of the pointing position by the pointing element 1 to be the width represented by the width information.

Further, it is also possible to use shading information representing the depth of the color in the line showing the trajectory of the pointing element 1 as the information based on the second signal Vout. In this case, the higher the pressure to the tip part 11 is, the deeper the light emission control section 192 makes the color in the line represented by the shading information, for example. The projector 2 determines the depth of the color in the line corresponding to the trajectory of the pointing position by the pointing element 1 to be the depth represented by the shading information.

Further, it is also possible to use color information representing the color of the line showing the trajectory of the pointing element 1 as the information based on the second signal. In this case, the light emission control section 192 changes the color represented by the color information in accordance with the pressure to the tip part 11. The projector 2 determines the color of the line corresponding to the trajectory of the pointing position by the pointing element 1 to be the color represented by the color information.

B4. Fourth Modified Example

Although in the first embodiment and the first modified example through the third modified example, the tip part 11 is used as an example of the pressurizing part, the pressurizing part is not limited to the tip part 11 of the pointing element 1, but it is possible to adopt a configuration of using a side button or the like on the side surface part. It is possible to make the light emitting part 16 emit light by the user making the finger or the like have contact with the side button. Thus, it becomes possible for the user to make an instruction of the process and so on even when it is unachievable to make the pointing element 1 have contact with the operation surface.

B5. Fifth Modified Example

Although the liquid crystal light valves 235 are used as an example of the light modulation device in the first embodiment and the first modified example through the fourth modified example, the light modulation device is not limited to the liquid crystal light valves, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices (DMD), or a system using a single digital mirror device. When using just one liquid crystal panel or DMD as the light modulation device, the members corresponding to the color separation optical system and the color combining optical system are unnecessary. Further, besides the liquid crystal panel or the DMD, any configurations capable of modulating the light emitted by the light source 234 can be adopted as the light modulation device.

B6. Sixth Modified Example

In the first embodiment and the first modified example through the fifth modified example, the processing section 26 and the storage section 25, in particular, the operation control section 261 and the display control section 262 can be installed in a processing device as a separated body from the projector 2 such as a PC (Personal Computer). The processing device as the separated body from the projector 2 is not limited to the PC, but can also be, for example, a tablet terminal or a smartphone.

In this case, substantially the same functions as those of the projector 2 are realized by a system including a projector and the processing device which is a separated body from the projector, and has the functions provided to the operation control section 261 and the display control section 262.

What is claimed is:

1. A pointing element configured to instruct an operation by being pressed against an operation surface, comprising:
   a pressurizing part;
   a pressure sensor configured to detect a variation in the pressurizing part;
   an opposed part opposed to the pressure sensor;
   a pressing part configured to change a pressing force of pressing the opposed part against the pressure sensor in accordance with the variation in the pressurizing part caused by the pointing element pressed against the operation surface; the opposed part being pressed against the pressure sensor both when the pressurizing part is pressed against the operation surface and when the pressurizing part is not pressed against the operation surface;
   a signal generation section configured to receive a first signal having a level based on the pressing force from the pressure sensor, and generate a second signal by changing the level of the first signal; and an output section configured to output information based on the second signal to outside of the pointing element.

2. The pointing element according to claim 1, further comprising:
an adjustment signal generation section configured to generate an adjustment signal, which is used to change the level of the first signal, based on a difference between a third signal generated by the signal generation section changing the level of the first signal prior to generation of the second signal, and a target signal to be a target of the second signal, wherein
the signal generation section generates the second signal by changing the level of the first signal based on the adjustment signal.

3. The pointing element according to claim 2, further comprising:
a control section configured to make the output section output the information based on the second signal, wherein
the target signal is determined based on an input range of the control section.

4. The pointing element according to claim 2, wherein
the first signal is a differential signal constituted by two signals, and
the signal generation section includes
a level change section configured to generate a fourth signal by changing a level of one of the two signals based on the adjustment signal, and
a differential amplifier configured to generate the second signal based on a difference between a level of the other of the two signals and the fourth signal.

5. The pointing element according to claim 1, wherein
the output section includes a light emitting part configured to emit infrared light, and
the light emitting part emits the light in a light emission pattern based on the second signal.

6. The pointing element according to claim 5, wherein
the pointing element includes a main body part and a tip part,
the tip part includes the pressurizing part and the light emitting part, and
the light emitting part emits light in accordance with a variation in the pressurizing part.

7. A display system comprising:
the pointing element according to claim 1; and
a display device configured to control an image to be displayed on a display surface based on the information to be output by the pointing element.

8. A method of controlling a pointing element which includes a pressure sensor, an opposed part opposed to the pressure sensor, and a pressurizing part, and instructs an operation by being pressed against an operation surface, the method comprising:
changing a pressing force of pressing the opposed part against the pressure sensor in accordance with a variation in the pressurizing part caused by the pointing element pressed against the operation surface; the opposed part being pressed against the pressure sensor both when the pressurizing part is pressed against the operation surface and when the pressurizing part is not pressed against the operation surface;
making the pressure sensor output a first signal having a level based on the pressing force;
generating a second signal by changing the level of the first signal; and
outputting information based on the second signal to outside of the pointing element.

9. The method of controlling the pointing element according to claim 8, further comprising:
generating a third signal by changing the level of the first signal prior to generation of the second signal; and
generating an adjustment signal, which is used to change the level of the first signal, based on a difference between the third signal and a target signal to be a target of the second signal, and
generating the second signal by changing the level of the first signal based on the adjustment signal.

10. The method of controlling the pointing element according to claim 9, wherein
the information is output based on the second signal, and
the target signal is determined based on an input range.

11. The method of controlling the pointing element according to claim 9, wherein
the first signal is a differential signal constituted by two signals,
a fourth signal is generated by changing a level of one of the two signals based on the adjustment signal, and
the second signal is generated based on a difference between a level of the other of the two signals and the fourth signal.

12. The method of controlling the pointing element according to claim 8, wherein
the pointing element includes a light emitting part configured to emit infrared light, and
the light emitting part emits the light in a light emission pattern based on the second signal.

13. The method of controlling the pointing element according to claim 12, wherein
the pointing element includes a main body part and a tip part,
the tip part includes the pressurizing part and the light emitting part, and
the light emitting part emits light in accordance with a variation in the pressurizing part.

* * * * *